United States Patent [19]

Trinh Dinh et al.

[11] Patent Number: 4,504,593

[45] Date of Patent: Mar. 12, 1985

[54] PROCESS FOR MANUFACTURING SUPPORTED BIMETALLIC OR PLURIMETALLIC CATALYSTS COMPRISING ONE OR MORE METALS FROM GROUP VIII AND AT LEAST ONE METAL FROM GROUP IV AND THE RESULTANT CATALYSTS THEREOF

[75] Inventors: Chan Trinh Dinh, Le Vesinet; Jean-Paul Bournonville, Chatou, both of France

[73] Assignee: Institut Francais du Petrole, Rueil-Malmaison, France

[21] Appl. No.: 573,279

[22] Filed: Jan. 24, 1984

[30] Foreign Application Priority Data

Jan. 24, 1983 [FR] France ................................ 83 01129

[51] Int. Cl.$^3$ .......................... B01J 31/12; B01J 31/28; B01J 31/34
[52] U.S. Cl. ..................................... 502/154; 585/260
[58] Field of Search ....................... 502/154, 242, 333; 585/260

[56] References Cited

U.S. PATENT DOCUMENTS

| | | | |
|---|---|---|---|
| 3,480,531 | 11/1969 | Mulaskey | 502/242 X |
| 3,617,527 | 11/1971 | Hilfman | 502/242 X |
| 3,736,252 | 5/1973 | Hayes | 502/330 X |

Primary Examiner—W. J. Shine
Attorney, Agent, or Firm—Millen & White

[57] ABSTRACT

For the selective hydrogenation of a hydrocarbon charge containing at least one acetylenic and/or diolefinic hydrocarbon, there is used a catalyst comprising at least one group VIII metal selected from the platinum, palladium, nickel and cobalt group, or a compound thereof, and at least one metal from the group comprising germanium, tin and lead or a compound thereof, wherein at least one compound from one of the above-defined group VIII metals and at least one compound of metal from the germanium, tin and lead group is incorporated in a carrier, e.g., alumina, and wherein the compound of metal from the germanium, tin and lead group is incorporated in the carrier as a hydrocarbyl compound of said metal.

13 Claims, No Drawings

PROCESS FOR MANUFACTURING SUPPORTED BIMETALLIC OR PLURIMETALLIC CATALYSTS COMPRISING ONE OR MORE METALS FROM GROUP VIII AND AT LEAST ONE METAL FROM GROUP IV AND THE RESULTANT CATALYSTS THEREOF

BACKGROUND OF THE INVENTION

This invention relates to the field of catalysts, especially supported catalysts and in particular to plurimetallic catalysts, their production and uses.

The major refining and petrochemical processes use heterogeneous catalysis to a large extent: the catalyst comprises a carrier and a metal in various forms (as oxide, sulfide, reduced metal). In some cases, the carrier may also take part in the reaction.

The requirement of more and more stable and selective catalysts has given incentive to much research, one essential result of which has been the formation of improved catalysts comprising several metals: a new generation of plurimetallic catalysts was thus created. This evolution has resulted in very substantial improvements in stability and selectivity.

The conventional preparation techniques by exchange from an aqueous solution of the one or more compounds which have to be fixed on the carrier lead to a macroscopically homogeneous distribution of the different metals over the whole volume of the carrier particle. Sometimes, successive impregnations of each metal are required. Moreover, this technique of impregnation with an aqueous solution may have the major disadvantage of modifying the surface structure of the carrier: acid attack, for example. All these features seem to indicate that the conventional procedure for obtaining a homogeneous phase containing two or more metals is far from being perfectly controlled.

An object of the present invention is to provide a method for the preparation of improved plurimetallic catalysts as well as the catalysts produced thereby.

This method consists of contacting a hydrocarbon compound of a metal selected from the group consisting of germanium, tin and lead with a catalyst containing one or more group VIII metals, selected from the platinum, palladium, nickel and cobalt group, deposited on a carrier. The proportion of element selected from the germanium, tin and lead group is from 0.1 to 10% by weight and more particularly from 0.2 to 6%. The proportion by weight of the one or more group VIII metals deposited on the carrier depends on the metal concerned; this proportion ranges from 0.1 to 5% and more advantageously from 0.2 to 2% for the platinum, iridium, rhodium, ruthenium and palladium group; it is from 0.1 to 10% and particularly from 1 to 5% for the nickel and cobalt group. The catalyst may also contain molybdenum.

The carrier may be selected from the group consisting of silica, different alumina types, silica-aluminas, coal and, preferably, from the various alumina types.

The catalyst may be prepared by different procedures of carrier impregnation and the invention is not limited to a particular one. The preparation preferably comprises two steps: a first one of fixing the one or more group VIII metals and then, after optional thermal activation, the fixation of one or more metals selected from the germanium, tin and lead group.

The fixation of the group VIII metal may be achieved by different methods. The impregnation consists, for example, of contacting the preformed carrier with an aqueous solution of a compound of the selected metal, the volume of the solution being in excess with respect to the retention volume of the carrier or equal to said volume. After having maintained the solution in contact with the carrier for several hours, the impregnated carrier is filtered, washed with distilled water, then dried under scavenging with air or an inert gas. The so-impregnated carrier may also be subjected to calcination in air at a temperature higher than 120° C. but, in everyy case, lower than 550° C.

The metal selected from the tin, germanium and lead group may be introduced onto the carrier already preimpregnated with the group VIII metal and optionally calcined or calcined and reduced, as a hydrocarbon solution of a hydrocarbyl-tin, hydrocarbyl-germanium and/or hydrocarbyl-lead compound. The contact between the preimpregnated carrier and the solution is maintained for several days. The carrier, thus impregnated with one or more group VIII metals and one or more metals from the tin, germanium and lead group, may undergo several washings with a hydrocarbon, for example with the hydrocarbon selected as solvent for the impregnation with the compound of metal(s) selected from the tin, germanium and lead group. After the washing step, the catalyst is dried, for example in a stream of air or inert gas (nitrogen, argon, helium) at a temperature from 80° to 120° C. After drying, the catalyst may optionally be calcined in air between 110° and 550° C. and preferably between 110° and 450° C.

Before use, the catalyst may be reduced, for example in hydrogen atmosphere, between 200° and 600° C. and preferably between 300° and 500° C., this reduction being optionally performed just after the drying or the calcination or subsequently by the user.

The group VIII metal may be supplied from such compounds as chlorides, nitrates, acetylacetonates or organic acid salts soluble in the impregnation solvent. Organometallic compounds of group VIII metals may be used as solution in a hydrocarbon, e.g. a saturated paraffinic hydrocarbon whose hydrocarbon chain contains 6 to 12 carbon atoms, a naphthenic hydrocarbon containing 6 to 12 carbon atoms or an aromatic hydrocarbon containing 6 to 11 carbon atoms; the preference will be given to acetylacetonates of group VIII metals.

The element selected from the tin, germanium and lead group may be introduced as an alkyl- or aryl-compound of said metals, for example as tetrabutyl-tin, tetramethyl-tin, tetrapropyl-germanium, tetraethyl-lead, diphenyl-tin, diphenyl-germanium or tetraphenyl-lead in hydrocarbon solution. These compounds preferably conform with the formula Me(R)n wherein Me=Sn, Ge or Pb, R=hydrocarbyl of 1-12 carbon atoms, identical or different, and n is an integer, preferably 2 or 4.

As already mentioned, various types of carriers can be used. A particularly suitable carrier is that having specific characteristics such as a specific surface, determined by the B.E.T. method, from 10 to 500 square meters per gram, preferably from 50 to 500 square meters per gram, and a total pore volume from 20 to 130 cc per 100 grams of carrier and preferably from 40 to 100 cc per 100 grams of carrier.

After deposition of the metals on the carrier, the catalyst is advantageously subjected to an activation treatment in hydrogen at high temperature, for example 200°–500° C., so as to obtain an active metal phase.

This treatment in hydrogen consists, for example, in a slow temperature rise under hydrogen steam up to a maximum reduction temperature ranging from 200° to 500° C. and, preferably, from 260° to 400° C., followed with the maintenance of said temperature for 1 to 10 hours.

These catalysts have particularly interesting properties for the selective hydrogenations of acetylenic and diolefinic compounds (particularly hydrocarbons), in the optional presence of sulfur and nitrogen compounds. They can also be used as catalysts for hydrodesulfurizing saturated or unsaturated hydrocarbon charges; their use results in a substantial decrease of the hydrogenation rate of unsaturated molecules (olefins or aromatics), this being of particular advantage when treating a light gasoline.

The following non limitative examples illustrate the invention. The metal contents of the catalysts are by weight. The hydrogenation reactions are mostly conducted at a temperature from 0° to 200° C., under a pressure from 1 to 100 bars, these values being not limitative and depending in particular on the type of hydrocarbon to be hydrogenated, on the type of carrier and of active metal.

EXAMPLE 1

Hydrogenation of isoprene to methylbutenes

The purpose of this example is the selective hydrogenation of isoprene (10% by weight in cyclohexane) to methylbutenes. A catalyst is first prepared by depositing palladium (0.3%) on an alumina of 70 square meters specific surface and 50 cc per 100 grams pore volume; the alumina carrier is impregnated by contact with a palladium nitrate solution. After washing and drying at 110° C., the catalyst is calcined at 300° C. On the palladium-on-alumina catalyst, tin is fixed from a solution of tetrabutyl-tin dissolved in toluene: after having maintained the contact for 4 hours with the tetrabutyl-tin solution at toluene reflux, the catalyst is washed with toluene and dried.

A 10% by weight isoprene solution in cyclohexane is treated with hydrogen in the following operating conditions:
Temperature: 148° C.
Pressure: 10 bars
VVH: 2 liters/liter of catalyst/hour
The results are given in the following Table:

| CATALYST ($Al_2O_3$ carrier) | CONVERSION (% mole) | SELECTIVITY TO PARAFFIN (% mole) | SELECTIVITY TO MONOOLEFIN (% mole) |
|---|---|---|---|
| 0.3% Pd | 100 | 100 | 0 |
| 0.3% Pd + 0.27% Sn | 98.6 | 3.2 | 96.7 |
| 0.3% Pd + 0.73% Sn | 97.1 | 2.5 | 97.5 |
| 0.3% Pd + 1.62% Sn | 12.7 | 0 | 100 |

The tin content increase up to 0.73% by weight does not significantly change the catalyst activity but considerably improves the catalyst selectivity for monoolefins production. Beyond a certain tin content, the catalysts are less active but still maintain their remarkable selectivity.

EXAMPLE 2

The reaction is the same as in example 1, except that tetrabutyl-germanium is used instead of tetrabutyl-tin for the catalyst manufacture. The reaction is conducted at 70° C. instead of 148° C.

The results are summarized in the following table:

| CATALYST | MOLAR CONVERSION (% mole) | SELECTIVITY TO PARAFFIN (% mole) | SELECTIVITY TO MONOOLEFIN (% mole) |
|---|---|---|---|
| 0.3% Pd | 100 | 100 | 0 |
| 0.3% Pd + 0.15% Ge | 97.4 | 15.5 | 84.5 |
| 0.3% Pd + 0.36% Ge | 42.6 | 0.8 | 99.2 |

EXAMPLE 3

The catalysts of example 2 are used for the same reaction but at a temperature of 148° C.

| CATALYST | MOLAR CONVERSION (% mole) | SELECTIVITY TO PARAFFIN (% mole) | SELECTIVITY TO MONOOLEFIN (% mole) |
|---|---|---|---|
| 0.3% Pd | 100 | 100 | 0 |
| 0.3% Pd + 0.15% Ge | 100 | 61.7 | 39.2 |
| 0.3% Pd + 0.36% Ge | 98.8 | 4.2 | 95.8 |

EXAMPLE 4

Isoprene is hydrogenated in the same conditions as in example 1, except that tetrabutyl-tin replaces tetrabutyl-lead in the catalyst manufacture.

The results are summarized in the following table:

| CATALYST | | Temperature (°C.) | Pressure (bars) | Molar Conversion (% mole) | Selectivity to paraffin (% mole) | Selectivity to monoolefin (% mole) |
|---|---|---|---|---|---|---|
| % Pd | % Pb | | | | | |
| 0.27 | 0.30 | 148 | 10 | 68.7 | 1 | 99 |
| 0.27 | 0.30 | 148 | 30 | 86.7 | 3.1 | 96.8 |
| 0.30 | 1.71 | 148 | 30 | 8.2 | 0 | 100 |
| 0.30 | 1.71 | 180 | 30 | 28 | 0 | 100 |
| 0.30 | — | 148 | 10 | 100 | 100 | 0 |
| 0.30 | — | | 30 | 100 | 100 | 0 |
| 0.30 | — | 180 | 30 | 100 | 100 | 0 |

The effect of lead on the catalyst activity is much greater than that of tin or germanium: a much more substantial decrease of activity is observed when using lead. The selectivity of the conversion to monoolefin is still very high, always higher than 95%.

EXAMPLE 5

Another property of metallic catalysts, which is very often determinant, is the resistance to poisoning and particularly to poisoning by sulfur compounds.

Isoprene, as a 10% by weight solution in cyclohexane, is hydrogenated in the presence of various amounts of thiophene or of butyl-mercaptan at a temperature of 120° C. under a total pressure of 10 bars and with a charge feed rate of 2 liters per liter of catalyst and per hour.

The catalyst, prepared according to the technique of example 1, consists of: 0.42% Pd+0.38% Sn on alumina.

| SULFUR COMPOUND | | MOLAR CON- VERSION (% mole) | SELECT- IVITY TO PARAFFIN (% mole) | SELECTIVITY TO MONOOLEFIN (% mole) |
|---|---|---|---|---|
| Nature | Con- tent (ppm) | | | |
| Thio- phene | 0 | 98.7 | 4.1 | 95.9 |
| | 1200 | 97.2 | 1.0 | 98.9 |
| | 2500 | 95.7 | 0.3 | 99.7 |
| | 5100 | 91.0 | 0.4 | 99.6 |
| | (*) 0 | 99.0 | 3.0 | 96.9 |
| n-butyl mercap- tan | 0 | 96.8 | 5.2 | 94.7 |
| | 30 | 90.8 | 0.3 | 99.7 |
| | 80 | 74.8 | 0.3 | 99.7 |
| | 390 | 48.2 | 0.3 | 99.7 |
| | 740 | 32.2 | 0.3 | 99.7 |
| | (*) 0 | 96.0 | 4.9 | 95.1 |

Marks (*) indicate the tests using the same catalyst after passage of the charge containing the sulfur compound and of a fresh feed of a sulfur-free charge.

This table shows that this bimetallic catalyst is resistant to poisoning by sulfur and that the poisoning reversibility is satisfactory.

EXAMPLE 6

This example relates to the selective hydrogenation of isoprene, as a 10% by weight solution in cyclohexane, to methylbutene, in the presence of pyridine (500 ppm of nitrogen). The catalyst according to the invention, prepared by the method of example 1, contains 0.3% palladium and 0.73% tin. The reaction is conducted at 120° C. under a 10 bars total pressure and a 9.2 H$_2$/HC ratio. The space velocity by volume is 2.

| CATALYST | | NIT- ROGEN (ppm) | TOTAL CON- VERSION (% mole) | SELECT- IVITY TO PARAFFIN | SELECT- IVITY TO MONO- OLEFIN |
|---|---|---|---|---|---|
| % Pd | % Sn | | | | |
| 0.3 | — | — | 100 | 100 | 0 |
| 0.3 | 0.73 | — | 99.0 | 3.0 | 96.9 |
| 0.3 | 0.73 | 10 | 96.2 | 2.0 | 98.0 |
| 0.3 | 0.73 | 490 | 94.7 | 0.9 | 99.0 |

The selectivity improvement due to the tin effect is accompanied with a remarkable resistance to nitrogenous substances.

EXAMPLE 7

Isoprene is selectively hydrogenated to methylbutene in the presence of a catalyst comprising platinum (2.3%) and tin (4.2%), prepared and used in the same conditions as in example 1.

The results are the following:

| CATALYST | MOLAR CON- VERSION | SELECTIVITY TO PARAFFIN | SELECTIVITY TO MONOOLEFIN |
|---|---|---|---|
| 2.3% Pt | 100 | 100 | 0 |
| 2.3% Pt + 4.2% Sn | 98.5 | 6.2 | 93.8 |

EXAMPLE 8

The same reaction as in example 7 is performed in the presence of 1200 ppm of sulfur as thiophene; whereas the catalyst containing only platinum is substantially inactive, the results with the bimetallic catalyst containing platinum (2.3%)+tin (4.2%), are as follows:

molar conversion: 98.2%
selectivity to monoolefin: 94.3%

The very high selectivity to monoolefin and the resistance to poisoning by sulfur, already observed for the palladium-tin pair, are also obtained in examples 7 and 8.

EXAMPLE 9

Isoprene, as a 10% solution in cyclohexane, is hydrogenated to methylbutene in the following conditions:

temperature: 180° C.—pressure: 50 bars—VVH: 2 liters of charge per liter of catalyst and per hour.

The catalyst comprises as basic materials nickel and tin deposited on alumina. Nickel is deposited on the alumina carrier from an aqueous solution of nickel nitrate. After drying at 110° C., the carrier, preimpregnated with nickel nitrate, is then calcined in air at 500° C. for 2 hours. Tin is then fixed on the carrier preimpregnated with nickel, as tetrabutyltin, according to the technique of example 1. The catalyst is activated with hydrogen at 450° C. for 8 hours before the reaction.

| CATALYST | | MOLAR CON- VERSION (% mole) | SELECT- IVITY TO PARAFFIN (% mole) | SELECTIVITY TO MONOOLEFIN (% mole) |
|---|---|---|---|---|
| % Ni | % Sn | | | |
| 1.6 | 0 | 100 | 100 | 0 |
| 1.6 | 4.2 | 88 | 9 | 91 |
| 1.6 | 8.5 | 60 | 1 | 99 |
| 3.9 | 0 | 100 | 100 | — |
| 3.9 | 4.4 | 94 | 22 | 78 |
| 3.9 | 8 | 89 | 13 | 87 |

The use of nickel-tin bimetallic catalysts gives a lower conversion rate but results in an incomparably higher selectivity to monoolefins than with a nickel monometallic catalyst.

EXAMPLE 10

The second type of application, of particular interest, of this catalyst, is the removal of sulfur compounds from a hydrocarbon composite charge without modifying the nature of the hydrocarbon compounds contained therein, i.e. without hydrogenating the unsaturated compounds.

Sulfur has to be removed from a toluene charge, the sulfur compound being butyl mercaptan used at a concentration of 900 ppm of sulfur. The catalyst comprises nickel (3.9%) and tin (8%) deposited on alumina, according to the method of example 9. The operating conditions are as follows:

pressure: 33 bars—VVH: 1 liter of charge per liter of catalyst and per hour.

The results obtained when varying the temperature from 250° to 400° C. are reported in the following table:

| TEMPER- ATURE | HYDRODESULFURATION RATE (%) | HYDRO- GENATION RATE (%) |
|---|---|---|
| 250 | 91.5 | 0 |
| 300 | 96.5 | 0 |
| 350 | 98.2 | 0 |
| 400 | 98.5 | 0 |

EXAMPLE 11

The operation of example 10 is repeated, except that the butyl-mercaptan concentration is increased so as to bring the sulfur content of the charge to 1100 ppm. The results are reported in the following table:

| TEMPERATURE (°C.) | BUTYLMERCAPTAN CONVERSION (%) | HYDRO-DESULFURATION RATE (%) | SWEETENING RATE (%) | TOLUENE HYDROGENATION RATE (%) |
|---|---|---|---|---|
| 300 | 97.2 | 77.9 | 19.3 | 0 |
| 350 | 97.6 | 80.0 | 17.6 | 0 |

EXAMPLE 12

The operation of example 11 is repeated, except that the catalyst of nickel-tin on alumina is replaced with a catalyst of palladium (0.25%) and tin (6.25%) deposited on alumina of 70 m$^2$/gram specific surface, according to the method of example 1. The results are reported in the following table:

| TEMPERATURE (°C.) | BUTYLMERCAPTAN CONVERSION (%) | HYDRO-DESULFURATION RATE (%) | SWEETENING RATE (%) | TOLUENE HYDROGENATION RATE (%) |
|---|---|---|---|---|
| 300 | 60.5 | 56 | 4.5 | 0 |
| 350 | 96.4 | 91.8 | 4.6 | 0 |

EXAMPLE 13

The operation of example 11 is repeated but with the use of a catalyst comprising cobalt (1.8%), molybdenum (7%) and tin (6%) deposited on alumina, according to the method of example 1, cobalt being introduced from cobalt nitrate, molybdenum from ammonium molybdate and tin from tetrabutyl-tin.

The results are reported in the following table:

| TEMPERATURE (°C.) | VVH (1/1/h) | BUTYLMERCAPTAN CONVERSION (%) | HYDRO-DESULFURATION RATE (%) |
|---|---|---|---|
| 300 | 1 | 100 | 99.4 |
| 300 | 5 | 99.8 | 99.3 |

No toluene hydrogenation was observed.

What is claimed as this invention is:

1. In a process for manufacturing a supported catalyst comprising at least one group VIII metal selected from the group consisting of platinum, palladium, nickel and cobalt, or a compound thereof and at least one metal selected from the group consisting of germanium, tin and lead or a compound thereof, wherein at least one compound from at least one of the said group VIII metals and at least one compound of at least one metal from said germanium, tin and lead group are incorporated in a carrier, the improvement which comprises introducing said compound of a group VIII metal into the carrier as an aqueous or organic solution of a compound of said metal; drying the resultant carrier containing said solution; and introducing into resultant dried carrier said compound of a metal from said germanium, tin and lead group as a hydrocarbyl compound of said metal.

2. A process according to claim 1, wherein the hydrocarbyl compound of germanium, tin and/or lead is introduced as a hydrocarbon solution of hydrocarbyl-germanium, hydrocarbyl-tin or hydrocarbyl-lead, further comprising drying the resultant catalyst.

3. A process according to claim 1, wherein the carrier is alumina, silica, silica-alumina or coal.

4. A process according to claim 1, wherein the group VIII metal is platinum and/or palladium and is used in a proportion from 0.1 to 5% of the catalyst weight.

5. A process according to claim 1, wherein the group VIII metal is nickel and/or cobalt, used in a proportion of 0.1 to 10% of the catalyst weight.

6. A process according to claim 1, wherein the catalyst also contains molybdenum.

7. A catalyst as obtained according to claim 1.

8. A process according to claim 1, wherein a hydrocarbyl compound of germanium is introduced into the catalyst.

9. A process according to claim 1, wherein a hydrocarbyl compound of tin is introduced into the catalyst.

10. A process according to claim 1, wherein a hydrocarbyl compound of lead is introduced into the catalyst.

11. A catalyst as obtained according to claim 8.

12. A catalyst as obtained according to claim 9.

13. A catalyst as obtained according to claim 10.

* * * * *